United States Patent [19]

LaPere

[11] 4,174,725
[45] Nov. 20, 1979

[54] ANTITAMPER ARRANGEMENT FOR A LOCKING FUEL SHUTOFF VALVE

[75] Inventor: Samuel LaPere, Wyandotte, Mich.

[73] Assignee: Allen LaPere

[21] Appl. No.: 816,600

[22] Filed: Jul. 18, 1977

[51] Int. Cl.² .............. B60R 25/04; F16K 17/36; F16K 35/06
[52] U.S. Cl. ............... 137/68 R; 70/242; 137/354; 137/384.2; 251/149.6; 251/294
[58] Field of Search .............. 123/198 B; 137/68 R, 137/69, 70, 71, 67, 351, 354, 383, 384.2–384.8; 251/142, 149, 149.1, 149.4–149.9, 66, 294; 180/114; 70/242

[56] References Cited
U.S. PATENT DOCUMENTS

| 2,393,679 | 1/1946 | Gunderson | 137/68 R |
| 2,881,789 | 4/1959 | Finazzo | 137/354 |
| 2,945,503 | 7/1960 | Atkinson | 137/68 R |
| 3,273,578 | 9/1966 | Clark | 137/68 R |
| 3,794,057 | 2/1974 | Badger | 137/68 R |
| 4,064,889 | 12/1977 | Gayle et al. | 137/68 R |

Primary Examiner—Martin P. Schwadron
Assistant Examiner—Richard Gerard
Attorney, Agent, or Firm—Krass & Young

[57] ABSTRACT

An arrangement is disclosed for use in conjunction with an antitheft locking fuel line shutoff valve for automotive vehicles which prevents efforts at bypassing or tampering with the valve in attempts to circumvent the locking fuel line shutoff valve. The antitamper arrangement includes a spring-biased fuel line blocking plug disposed within the fuel line and positioned just behind the vehicle fuel pump inlet stem, the blocking plug being restrained from blocking engagement with the fuel pump by means of a flexible cable connected to a rod integral with the blocking plug, the cable passing down the length of the fuel line and anchored at the locking fuel line shutoff valve. A second blocking plug is also disclosed as optionally being included, disposed at the point at which the fuel line is connected to the outlet of the vehicle fuel tank with the second blocking plug being similarly spring-biased and restrained by means of a second flexible cable passing down the length of the fuel pipe and connected to the other end to the locking fuel line shutoff valve. Cutting or disassembly of the fuel line for the purpose of bypassing the shutoff valve is rendered much more difficult since release or cutting of either of the flexible cables will result in release of one or both of the blocking plugs and cut off the fuel supply to the engine.

11 Claims, 3 Drawing Figures

ANTITAMPER ARRANGEMENT FOR A LOCKING FUEL SHUTOFF VALVE

BACKGROUND OF THE INVENTION

1. Field of the Invention

This invention concerns antitheft devices and more particularly is concerned with locking fuel line shutoff valves designed to prevent unauthorized operation of the motor vehicle by providing a key-operated or locking valve shutting off the fuel supply to the vehicle engine.

2. Description of the Prior Art

Due to the emergence of the modern professional auto thief, the conventional ignition and door lock prevention of unauthorized operation of the vehicle has become too easily circumvented for effective antitheft protection. It is well known that the theft-to-order professional can enter a locked car and start the vehicle engine within a matter of minutes and indeed seconds in the usual situation. Thus, a need for supplemental arrangements to the ignition and door locks are seen by many as desirable particularly in high crime areas and for vehicles especially subject to theft. While no system can truly defeat the determined professional with unlimited time, generally if the efforts of the thief require more than just a few minutes, the theft will effectively be prevented since such professional will ordinarily not attempt to expend more than this matter of several minutes defeating whatever antitheft arrangements are encountered.

An example of one effort at preventing theft is the steering wheel locks now standard in automobiles. Such systems have not served to effectively deter the professional thief.

Another such system which has heretofore been proposed is described in U.S. Pat. No. 2,881,789 to Finazzo is the locking fuel line shutoff valve. Often such antitheft fuel shutoff arrangements include valves which are merely mounted beneath the hood of the automobile, although in the system involved in Finazzo, the fuel line is interrupted in approximate alignment with the front seat of the vehicle and the lock tumbler mechanism which operates the valve projects upwardly into the passenger compartment for convenient access thereto by the vehicle operator. While all such arrangements interpose one further obstacle to the would-be thief, these particular systems as implemented are easily bypassed by simply cutting the tubing leading into and out of the locking fuel line shutoff valve and effectively bypassing the valve and enabling the fuel to be supplied to the engine. This bypassing manuever can be carried out very quickly to thus allow substantial risk of theft notwithstanding its provision. Of course, any such antitheft arrangement or device should be desirably relatively simple and trouble-free and should not pose maintenance burdens to the owner and reduce significantly the reliability of operation of the vehicle since convenience factors loom large in the minds of most car owners.

Furthermore, since these devices are typically purchased by do-it-yourself mechanics, their installation should not be unduly complex and, even if put together by professionals, the time required for installation should very desirably be kept to a minimum to reduce the cost of installation of the device. Similarly, the cost of the device itself should be kept low in accordance with the market factors involved with such automotive consumer add-on devices.

Accordingly, it is an object of the present invention to provide an antitheft locking fuel shutoff device which greatly increases the difficulty encountered in defeating the device by a would-be thief or other unauthorized vehicle operator.

It is a further object of the present invention to provide an antitamper arrangement for such locking fuel shutoff valves which is relatively simple and fail-safe in operation.

It is yet another object of the present invention to provide such an antitamper device for locking fuel shutoff valves which is easily installed and reliable in operation and which may be manufactured at very low cost.

SUMMARY OF THE INVENTION

These and other objects, which will become apparent upon a reading of the following specification and claims, are accomplished by the arrangement including a spring-mounted blocking plug disposed within the fuel line in proximity to the engine fuel pump which is adapted when seated on the fuel pump inlet stem to shut off fuel flow to the vehicle engine. The blocking plug is normally positioned away from the fuel pump stem against the bias of the spring to which it is connected by means of a flexible cable connected to a rod mounted in the blocking plug and extending down the length of the fuel line having its other end anchored to the locking fuel line shutoff valve. A second similar antitamper arrangement may also be provided at the fuel tank end of the fuel line with a similar blocking plug disposed in the fuel line in immediate juxtaposition to the fuel tank and a second flexible cable connected to the shutoff plug extending down through the fuel line to the fuel line shutoff valve and restraining the blocking plug against the bias of the spring to which it is connected from being seated on an opening in the fitting for connecting the fuel line to the fuel tank. A length of flexible tubing is provided within which the blocking plug and connected spring are mounted which is adapted to be connected to the segment of the fuel line just ahead of the fuel pump and/or fuel tank locations, so that the arrangement may be added to existing vehicles by removing a length of the existing fuel lines at these locations and installing the flexible fuel lines having the blocking plugs and cables mounted therein. Also, there may be included a shield arrangement which prevents ready access to the shutoff valve. The fuel shutoff valve itself is disclosed as a key-operated, mechanically-actuated shutoff valve located beneath the driver/passenger compartment at the approximate location of the driver's seat to provide access by the vehicle operator.

DETAILED DESCRIPTION

In the following detailed description, certain specific terminology will be utilized for the sake of clarity and a specific embodiment described in accordance with the requirements of 35 USC 112, but the same should not be construed as intended to be limiting inasmuch as the invention is capable of taking many forms and variations within the scope of the appended claims.

Figure 1:
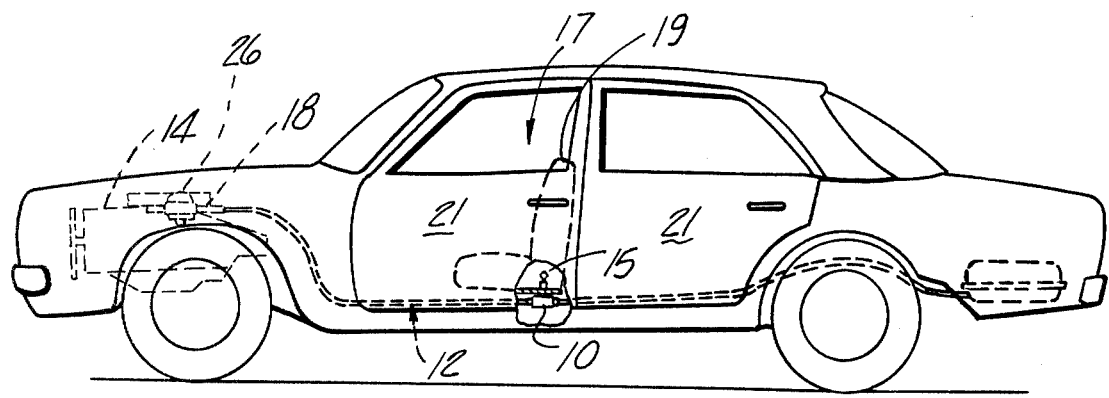
FIG. 1 is a side elevational view of a vehicle having installed a locking fuel line shutoff valve of the type to which the present invention is to be applied.

Referring to the drawings, and particularly to FIG. 1, the system to which the antitamper arrangement according to the present invention is adapted, involves the interposition of a fuel line shutoff valve 10 in the fuel line 12 so as to controllably discontinue the flow of fuel to the vehicle engine 14. Advantageously, in the case of a key-operated valve the valve 10 is mechanically actuated by a key operator 15 or with a key allowing the operation of the shutoff valve 10 by a valve handle (not shown). The locking valve 10 would advantageously be located intermediate the vehicle fuel tank 16 and the vehicle engine 14 placing it in approximate location beneath the driver's seat 19 as shown in FIG. 1. The portion of the locking valve 10 carrying the key operator 15 protruding into the driver's compartment 17 is preferably along side the driver's seat so that very convenient operator access thereto is afforded by the location.

The location of the locking portion of the shutoff valve 10 within the driver's compartment 17 also provides the additional advantage that the locking of the car doors 21 will further hamper efforts by the would-be thief at defeating the system.

In the aforementioned U.S. patent, a particular configuration of a locking fuel shutoff valve and associated locking valve operator is disclosed, but in the particular locking shutoff valve design utilized for purposes of the present antitamper arrangement, it is not critical. Other locking fuel line valves have been known in the past and are suitable for incorporation into the arrangement according to the present invention. Accordingly, the details of the same are not here included, reference being made to the aforementioned U.S. patent for the purpose of citing an example of one suitable design.

Suffice it to say that the locking fuel line shutoff valve 10 is operated by means of a key or other lock controlled operating device so that only a person in possession of the proper key, which may be the vehicle ignition key, may open the valve after it has been shut off in situations which, in the judgment of the operator, present a sufficient risk of theft to warrant the inconvenience of the additional locking procedure.

Figure 2:
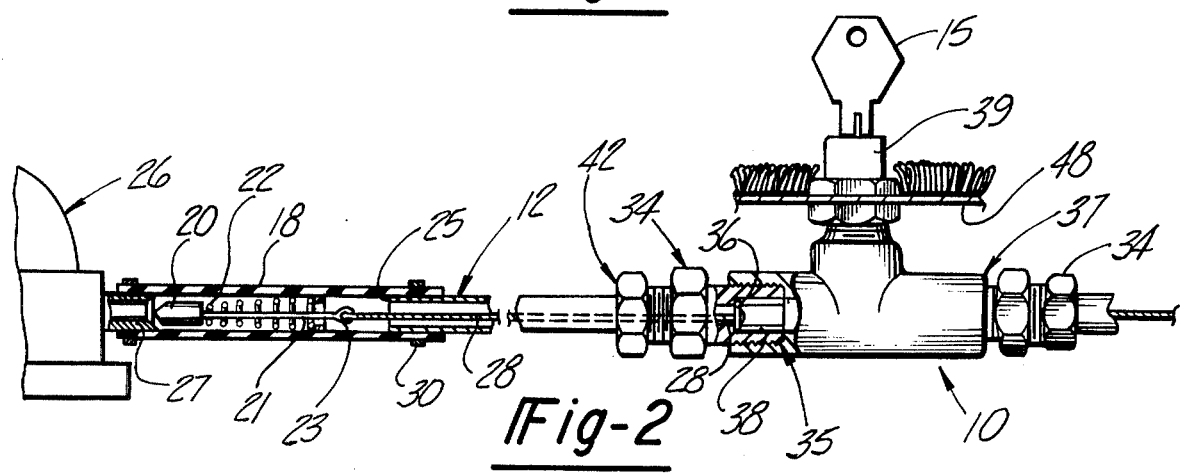
FIG. 2 is an enlarged view of the fuel line and locking shutoff valve details in partial section showing the antitamper arrangement according to the present invention.

The details of the antitamper arrangement, according to the present invention, can thus be seen as disclosed in FIGS. 1 and 2. This arrangement includes the provision of a short length of flexible fuel line hose 18 which is interposed between the fuel pump 26 and the existing fuel line 12, a similar length of fuel line 12 for installation purposes being severed to accommodate the length of hose 18. The length of hose 18 has disposed within it a fuel line blocking plug 20 which is attached or otherwise engaged with the end of a tapering helically wound compression spring element 22 which is positioned within the hose 18 by means of one end being seated on a pressed ring retainer which engages the other end of the tapered compression spring.

The tapered element 22 and the blocking plug 20 are positioned with the compression spring element 22 in the relaxed state approximately ½ inch from the end of the hose 18 such that upon installation or assembly of the hose end onto the fuel pump 26, the fuel pump inlet stem 27 may be projected into the hose end the ½ inch distance so as to come into blocking contact with the plug 20.

The blocking plug 20 has attached thereto by means of a short rod 21 having an attachment eye 23 a cable 28. The cable 28 passes down the length of the hose in the opposite direction from the fuel pump 26. This necessitates installation of the cable 28 in the fuel line 12 prior to securement of the hose 18 over the severed end 25 of the existing fuel line 12, this being secured thereto by means of a clamp 30.

The cable 28 is threaded down to the fuel line shutoff valve 10 and anchored within the valve in a position in which the blocking plug 20 has been withdrawn from blocking engagement with the fuel pump stem 27 by tensioning the cable 28 prior to anchoring it to the shutoff valve 10.

Since an anchoring arrangement may take the form of an anchor pin 36 around which the cable 28 is looped and anchored within universal adapter bushing 34 which may be used for adapting the valve housing inlet and outlets 35 to fuel line sizes of various fuel line sizes, i.e., ¼, 5/16 and ⅜ inch diameter fuel lines. This anchoring may be by the provision of an internal slot 38 receiving the pin 36 and anchoring it within the bushing 34 as shown in FIG. 2. The slot 38 terminates before the internal opening defined by the taper seat constituting the pressure fitting against which the flared end of the fuel line 12 is by normal practice seated to produce a fluid tight connection.

The bushing 34 itself will normally have external pipe threads as suitable valves 10 are normally so formed with threads to prevent leaks. The pressure fitting 42 is provided to secure the fuel line 12 to the bushing 34 by means of a mating taper and conical seat forcing the flared end of the fuel pipe 12 against it in a manner well known.

The fuel line shutoff valve 10 is installed as shown with the projecting locking portion 39 thereof extending upwardly through the vehicle floor pan 48 typically having a lock mechanism operated by the key 15 so that the shutoff valve 10 may be opened or closed to thereby control the fuel flow through the fuel line 12.

A similar bushing is provided at the inlet 37 of the shutoff valve 10 and adapted to have received therein a similar cable and locking plug arrangement as disclosed above in conjunction with the engine fuel pump 26.

It can be seen that any attempt to disassemble the system or to sever the fuel line either causes severing or release of the cable 28 which in turn results in release of the blocking plug 20 allowing it to move into engagement with the fuel line stem 27 thereby shutting off the supply of fuel to the vehicle engine 14. While there are possible circumventing steps which the thief could take to defeat the antitampering device, the majority of these steps would be relatively time-consuming or conspicuous as, for example, the provision of a small fuel supply container such as a gas can which could be hooked up to the engine fuel pump. These measures however would, in all probability, be deemed too risky by the professional since the time available before the risk increases unacceptably is fairly limited and also the circumventing activity would be relatively conspicuous to further increase the risk involved.

The antitamper arrangement is intended to defeat short term efforts at circumventing the fuel line shutoff valve 10 by a bypass and in this regard very effectively would prevent bypass attempts since severing or disassembly of the fuel line will result in a shutoff of the fuel.

Figure 3:
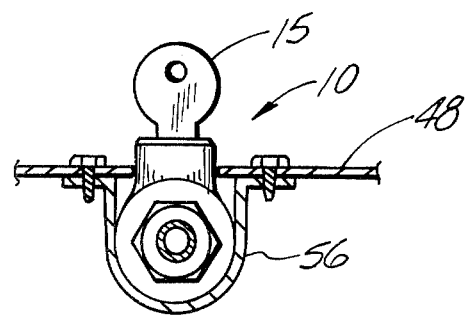
FIG. 3 is a sectional view through the locking shutoff valve showing the antitamper shielding arrangement adapted to be disposed about the fuel line shutoff valve.

FIG. 3 shows an additional antitamper expedient which may be provided which takes the form of a cover or shield 56 which is mounted to surround the fuel valve shutoff 10 bolted to the vehicle underpan 48 as shown which would further preclude tampering of the valve 10 itself and hence the access to the valve 10 would be relatively time-consuming to effect.

The various components such as the blocking plug 20, cable 28, etc., should be constructed of materials which will not be attacked by the fuel.

Accordingly, it can be seen that a relatively simple, yet effective antitamper device has been provided for use in conjunction with locking fuel line shutoff valves of the type adapted to control the operation of a shutoff valve to prevent unauthorized operation of the vehicle and it can also be seen that the operation of the device should be highly reliable and malfunctioning of the system would be minimal since no moving parts are involved and the system only comes into operation in the aforementioned eventuality. It can also be appreciated that the system is relatively simple and low in cost to fabricate and accordingly may be sold at very modest prices in accordance with the pricing structures existing in the automotive accessory market for this type of device. Furthermore, the installation should be relatively simple and able to be carried out by the average mechanically inclined car owner.

Many variations of course are possible such as the anchoring of the cable within the valve and could be carried out in such a way that it creates release upon disassembly of the bushing and an infinite variety of such anchoring arrangements is manifestly possible.

The embodiments of the invention in which an exclusive property or privilege is claimed are defined as follows:

1. An antitamper device for use in conjunction with an automotive vehicle fuel line shutoff valve, the arrangement comprising:
   a blocking plug disposed within the fuel line movable between an open and closed position;
   a resilient spring element engaged at one end with said blocking plug having the other end positioned within the fuel line;
   means releasably restraining said blocking plug in said open position with said spring element compressed in said fuel line;
   an element located in said fuel line at said closed position of said blocking plug cooperating with said plug to effect a fuel line blockage upon release of said means restraining said blocking plug and movement of said blocking plug to said closed position under urging of said compressed spring element;
   said means releasably restraining said blocking plug element including a flexible element and also including means connecting said flexible element to said blocking plug, said flexible element extending through said fuel line, said means releasably restraining said blocking plug element including means anchoring one end of said flexible element proximate said fuel line shutoff valve in a position in which said blocking plug is positioned in said open position with said spring element compressed;
   whereby cutting of said flexible element will allow movement of said blocking plug to said closed position to effect said fuel line blockage.

2. The device according to claim 1 wherein said flexible element comprises a cable member.

3. The device according to claim 1 wherein said means anchoring said flexible element includes a pin element secured to said one end of said flexible element and anchored and disposed transversely to said fuel line.

4. The device according to claim 1 wherein said blocking plug is located in said fuel line immediately upstream of the automotive vehicle fuel pump.

5. The device according to claim 4 further including a second blocking plug movable to an open and closed position in said fuel line proximate said vehicle fuel tank and a second resilient spring element engaging said second blocking plug at one end and secured within said fuel line and further including means releasably restraining said second blocking plug in said open position with said second spring element compressed, said means including a second flexible element extending within said fuel line and connected at one end to said second blocking plug and also including means anchoring said second flexible element at the other end within said fuel line at a point proximate said shutoff valve.

6. The device according to claim 5 wherein said first mentioned flexible element and said second flexible element both comprise flexible cables.

7. The device according to claim 6 wherein said fuel line is connected to said shutoff valve by means of fittings and wherein said flexible cables are both anchored within said fittings.

8. The device according to claim 7 wherein said means anchoring said flexible cables comprises a pin connected to each of said other flexible cable ends and a transverse slot formed in each of said fittings and said pins are disposed in a respective slot.

9. The device according to claim 1 wherein said blocking plug is located immediately downstream of the automotive vehicle fuel tank.

10. The device according to claim 1 further including a shield at least partially surrounding said shutoff valve.

11. The device according to claim 1 wherein said spring element comprises a tapered helically wound spring.

* * * * *